Jan. 31, 1967

B. A. AULD 3,302,136

ELASTIC WAVEFRONT SHAPING

Filed Oct. 6, 1964

3 Sheets-Sheet 1

INVENTOR
B. A. AULD
BY
ATTORNEY

3,302,136
ELASTIC WAVEFRONT SHAPING
Bert A. Auld, Menlo Park, Calif., assignor to Bell Telephone Laboratories, Incorporated, New York, N.Y., a corporation of New York
Filed Oct. 6, 1964, Ser. No. 401,902
12 Claims. (Cl. 333—30)

This invention relates to elastic wave transmission systems and, more particularly, to methods and means for shaping the wavefront of elastic wave energy in said systems.

Elastic wave systems such as delay lines take advantage of the fact that the velocity of propagation of an elastic wave vibration or an ultrasonic wave is much lower than that of electrical signals by transforming the electrical signal into an elastic wave, sending the elastic wave down a mechanical wave transmission medium, and reconverting the wave into an electrical signal at the far end.

Similar to directed beams of other forms of wave energy, elastic waves tend to diverge or spread out into the transmission medium as they propagate allowing undesirable interactions with the boundaries of the medium In addition, since the output transducer receives only a fraction of a beam which has spread, a substantial portion of the energy is lost.

It is therefore one object of the present invention to focus elastic wave energy in its transmission medium.

In accordance with the invention, it has been discovered that elastic wave propagation through a magnetized member of gyromagnetic material interacts with spin waves generated therein in a way which influences the phase of the elastic wave. When the magnetic field strength in the medium is nonuniform so that the axial component of magnetic field strength changes with radial distance away from the axis of symmetry, the interaction causes portions of the elastic wavefront to be shifted in phase with respect to other portions thereof. In particular, if those portions in the center of the front are retarded in phase to a greater extent than portions near the outer regions of the front, the energy of the wave is converged. If this phase relationship is reversed, the energy is diverged.

It is therefore a broad object of the invention to shape the wavefront of elastic wave energy by means of a magnetized member of gyromagnetic material.

Certain features of the invention reside in the ways in which magnetic field distributions suitable for focusing and defocusing are produced in elements of gyromagnetic material and in the specific and novel uses of the wave shaping phenomena.

Figure 1:
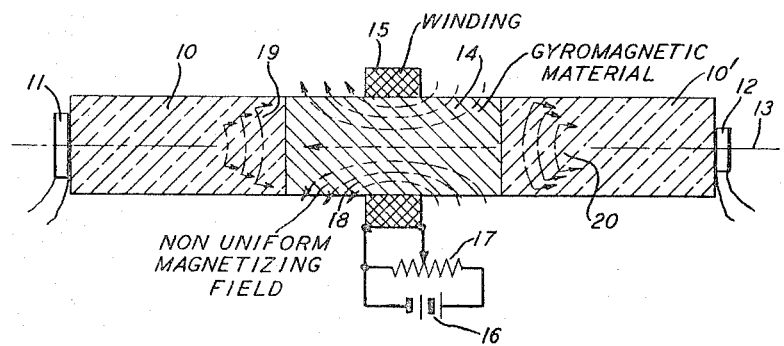
Figure 2:
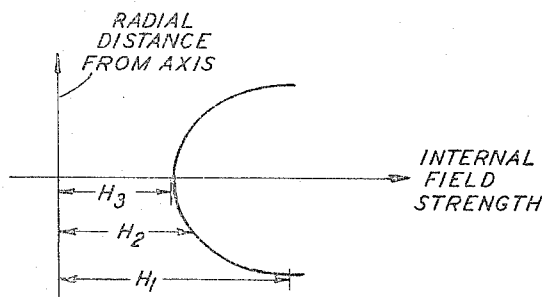
Figure 3:
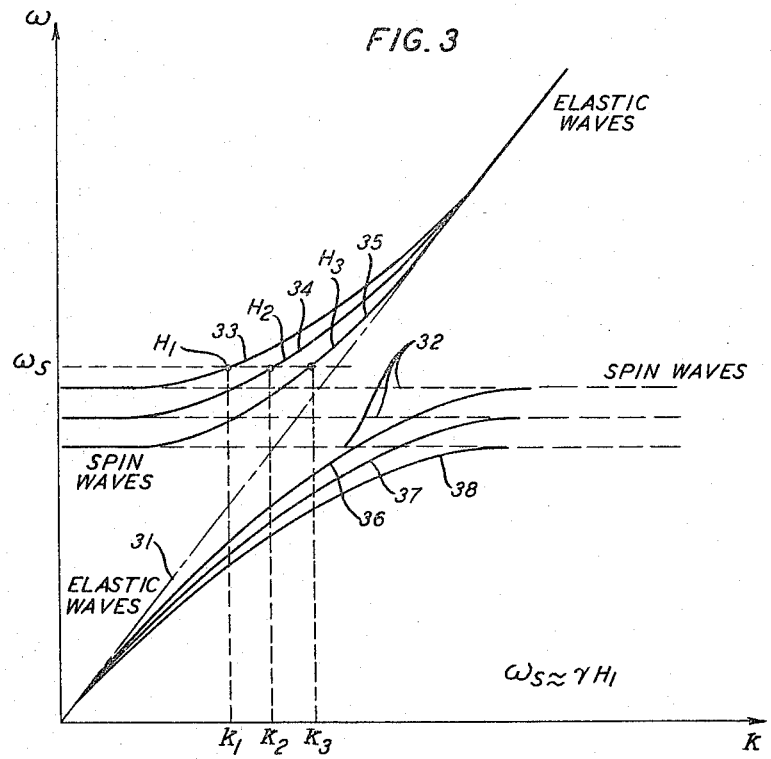
Figure 4:
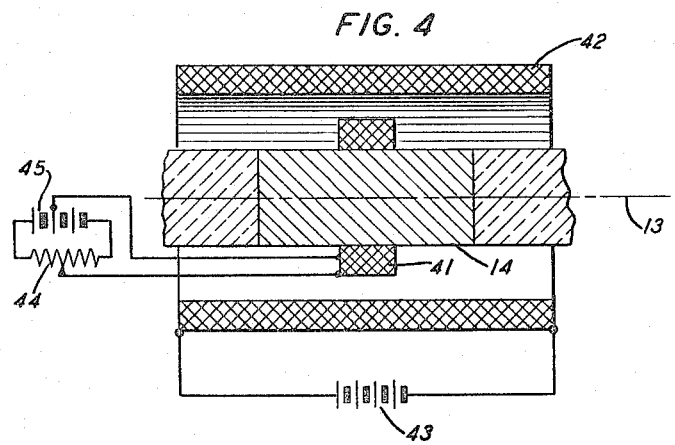

Other objects and features, the nature of the present invention and its various advantages, will appear more fully upon consideration of the specific illustrative embodiments shown in the accompanying drawings and described in detail in the following explanation of these drawings, in which:

FIG. 1 is a cross-sectional view of an illustrative delay line application of the principles of elastic wave focusing;

FIG. 2, given for the purpose of explanation, is a plot of the magnetic field strength distribution in the gyromagnetic element of FIG. 1;

FIG. 3, given for the purpose of illustration, is a typical dispersion characteristic which shows the relationship between elastic waves and spin waves in the gyromagnetic element of FIG. 1;

FIG. 4 illustrates an alternative way in which a focusing or a defocusing magnetic field distribution may be produced; and FIGS. 5 through 8 illustrate, by way of cross-sectional views, further ways of producing desired magnetic field distributions.

Referring more particularly to FIG. 1, an illustrative embodiment of the invention is shown as it might be incorporated for focusing in a conventional delay line system. For example, the delay line comprises a cylindrical body formed in two portions 10 and 10' from any suitable elastic wave transmission material such as glass or vitreous silica, or from a metal alloy of grain size small compared to the wavelength of the elastic wave to be supported.

Means are provided at the left and right ends, respectively, for converting an electrical input signal into an elastic wave in rod 10 and in turn for coupling an elastic wave from rod 10' to an electrical output load. These means may be conventional piezoelectric ceramic, crystal, or magnetic transducers 11 and 12 bonded respectively to the ends of rods 10 and 10' by standard techniques so that when input transducer 11 is excited by an alternating voltage, a linearly polarized shear mode, a circulatory polarized shear mode or a longitudinal mode of elastic vibration is launched in rod 10 traveling parallel to axis 13 toward the opposite end where the vibrations generate an electrical signal in output transducer 12. The particular characteristics of each of these modes and transducers particularly suited for each will be considered hereinafter.

Interposed at some point along the delay path is a focusing means in accordance with the invention. As illustrated, this means comprises a gyromagnetic element in the form of a cylindrical rod 14 which is suitably bonded between the opposing ends of rods 10 and 10'. Rod 14 is preferably formed from a single crystal of nonconductive ferromagnetic material (the term including appropriate ferremagnetic and ferrimagnetic materials) of the type having substantial gyromagnetic properties, reasonably low magnetic losses, large magnetoelastic coupling constants, and high acoustical Q. Suitable for this purpose are yttrium iron garnet, lithium ferrite, europium iron garnet and other nonconducting ferrimagnetic and ferromagnetic materials. While the orientation of the crystal axes in rod 14 does not appear to be critical, it is preferred that the cylindrical axis 13 coincide with one of the crystal axes if only to facilitate mode purity of the elastic wave signal.

Means are provided for applying to rod 14 a steady, axially directed biasing magnetic field which has a radial strength variation within rod 14 that increases with distance as measured away from the axis 13. While there are numerous ways in which such a field may be generated, one of the simplest involves a flattened solenoid winding 15 which has an axial dimension or length that is small compared to its radial dimension so that its net field pattern, as represented by the field lines 18, produces a strength distribution substantially as shown in FIG. 2. This distribution is due in part to the fact that the total field pattern in a solenoid of small axial length is strongly influenced by the fringing effects at its ends. Such a solenoid is to be contrasted to one that has a length large with respect to its radius and which produces a field that is substantially radially uniform. Solenoid 15 is supplied with a variable direct current, as for example by a battery 16 connected to the solenoid through rheostat 17. This current is such that the field strength generated by solenoid 15 biases the material of rod 14 into the region of magnetoelastic interaction at the signal frequency. As will be explained with reference to FIG. 3, elastic waves entering rod 14 from rod 10 will be strongly coupled to spin waves within rod 14 and the phase of the elastic wavefront will be retarded according to the magnetic strength distribution in rod 14.

FIG. 3 shows a typical dispersion characteristic for spin waves and transverse elastic waves including the effect of magnetoelastic interaction. A full development of this characteristic along with the equations which underlie it may be found in paper entitled "Generation of Phonons in High-Power Ferromagnetic Resonance Experiments" by Ernst Schlomann in the Journal of Applied Physics, volume 3, page 1647, September 1960. Particularly, FIG. 3 shows the relation between angular frequency $\omega$ and the wave number $k$, where $$k = \frac{2\pi}{\lambda}$$

and $\lambda$ is the wavelength.

In the absence of magnetoelastic interaction, the dashed curve 31 represents pure transverse elastic waves and the dashed curves 32 represent pure spin waves for different magnetic field strengths, H, within a ferromagnetic material. The solid curves represent waves in the presence of magnetoelastic interaction. Thus, curves 33, 34 and 35 are referred to as the upper branch and represent the waves for respectively decreasing field strengths $H_1$, $H_2$ and $H_3$. For low values of $k$, the waves of the upper branch are essentially spin while for high values of $k$ they are essentially elastic. Between these extremes, the elastic and spin waves are strongly coupled as magnetoelastic waves. The art has designated this region as the cross-over region. The cross-over frequency $\omega_{cr}$ is a function of the biasing field $H_i$ according to the relationship $$\omega_{cr} = \gamma H_i$$

where $\gamma$ is the gyromagnetic ratio of the particular material under consideration and $H_i$ is the internal field after accounting for demagnetizing factors. Similar curves 36, 37 and 38 represent the corresponding waves of the lower branch.

Operation in accordance with the invention may be had upon either the upper or lower branches and may be adequately illustrated by the operation upon the upper branch only for a given signal frequency $\omega_s$. For this purpose the field strength within rod 14 is adjusted so that the maximum field $H_1$ is approximately $\omega_s/\gamma$. Thus, although the cross-over frequency depends on the field $H_i$, the frequency $\omega_s$ will be near the cross-over frequency for every field in the range $H_3$ to $H_1$, and an elastic wave of frequency $\omega_s$ will be strongly coupled to spin waves at every radial distance from the rod 14.

It will now be noted that the wave number $k$ is a function of the magnetic field strength, i.e., $k_1$ for $H_1$; $k_2$ for $H_2$; and $k_3$ for $H_3$. This fact is represented on FIG. 3 by the intersection of ordinate value $\omega_s$ with curves 33, 34 and 35. The phase retardation of a magnetoelastic wave propagating through a length of material L is $$\theta = \frac{2\pi L}{\lambda}$$

Since $$k = \frac{2\pi}{\lambda}, \quad \theta = kL$$

and the phase retardation is a function of the magnetic field strength in the several regions of the material. Thus, portions of the wavefront propagating along axis 13 through rod 14 of FIG. 1, magnetized in accordance with FIG. 2, will encounter the smallest field strength, the largest $k$, and will undergo a greater phase retardation as compared to the portions of the front on the outer edges. This means that a plane wavefront or even one which has become convex will be converted into a concave wavefront and the energy will be focused upon output transducer 12 in the same way as would an optical wave passing through a converging lens. The degree of focusing depends upon the rate of change in the magnetic field strength radially out from axis 13 so that varying the current through a given solenoid 15 varies the radial rate of change of the field, the degree of focusing and the focal length.

It was mentioned above that transducers 11 and 12 may generate and receive linearly polarized shear or transverse modes, circularly polarized shear modes or longitudinally polarized modes of vibration. If the linearly polarized modes are employed, focusing in accordance with the invention will also be accompanied by a polarization rotation of the type described by H. Matthews in Patent 3,121,849, granted February 18, 1964. Care must then be taken to properly align the selective polarization directions of the input and output transducers. To avoid polarization rotation in an application in which it is not otherwise desired, a circularly polarized mode may be employed. Known transducers for generating such a mode are disclosed by Raba A. Shahbender in the I.R.E. Transactions on Ultrasonics Engineering, volume UE-8, March 1961 at page 21 or by Bommel and Dransfeld in the Physical Review Letters, volume 3, July 15, 1959 at page 83 or in the copending application of R. T. Denton et al., Serial No. 226,381, filed September 26, 1962.

Finally, longitudinal modes which will not experience a polarization rotation may be used to practice the invention. While the dispersion characteristics of FIG. 3 are specific to transverse modes, a similar characteristic will describe the analogous behavior of the longitudinal modes. Suitable longitudinal mode transducers are described by T. R. Meeker in I.R.E. Transactions on Ultrasonics Engineering, volume UE-7, June 1960, page 53.

Ultrasonic wave focusing in accordance with the invention has several useful applications. The first of these uses in inherent in the combination illustrated in FIG. 1 by means of which the natural tendency of an ultrasonic beam in an isotropic medium to spread as it propagates can be overcome. The difficulty which spreading causes in ordinary delay line applications is well known. Not only is power lost through the failure of all the launched energy to reach the output transducer but also if the beam spreads sufficiently to reach the outer boundaries of the medium, serious distortion and possible spurious signals will result. Thus, as illustrated in FIG. 1 a beam which has spread even to the point of having a convex wavefront as represented by front 19, can be condensed at one or more points along the path and redirected toward the output transducer as illustrated by front 20. It is therefore possible to employ an input transducer of large area as represented by transducer 11 to provide a noise advantage by launching a large amount of energy into the line with, however, low specific or low power per unit area to avoid nonlinearities. As the energy is dissipated by the inherent losses in the path, the remaining power is focused upon output transducer 12 of small area compared to input transducer 11 at a rate which maintains the power level below the level of nonlinearity.

On the other hand, by further reducing the area of output transducer 12 and intentionally concentrating the energy upon it beyond the level at which the elastic wave transmission material preceding the transducer becomes saturated, limiting action occurs. This new function is achieved when the transmission material conveys the full amount of energy of which it is capable. Thus, the level of limiting can be controlled by controlling the degree of focusing. Similarly, the nonlinear properties of the material just below the limit of saturation may be utilized to generate harmonics and otherwise to provide nonlinear elastic wave interaction.

In a typical material such as yttrium iron garnet, the field strength required for magnetoelastic interaction with a signal of several hundred megacycles is in the order of several hundred oersteds. A field of this magnitude is difficult to obtain with a solenoid flat enough to produce the desired nonuniformity without excessive coil currents. To eliminate this difficulty FIG. 4 illustrates how a nonuniform field produced by a flattened coil 41 of few ampere turns, may be superimposed upon a substantially uniform field of large magnitude produced by a long solenoid 42 of many ampere turns supplied from source 43. When rheostat 44 is adjusted with respect to the polarity of sources 45 and 43, the fields produced by solenoids 41 and 42 combine in reinforcing polarity to produce a field distribution suitable for focusing as illustrated in FIG. 2.

A further feature of the invention which can also be illustrated by FIG. 4 is that of defocusing, that is, the property of a diverging lens. Thus, by positioning rheostat 44 so that the polarity of the nonuniform field produced by solenoid 41 opposes that produced by solenoid 42, the net field is largest along axis 13 of rod 14 and smallest near its circumference. A wavefront of elastic wave energy applied thereto will undergo its greatest phase retardation near the circumference and will be converted into one of convex wavefront. Such a configuration is useful for either permanently or periodically clearing out elastic wave energy from a path by diverging it toward the side boundaries of the path where is can be dissipated. Variation of the degree of defocusing by adjustment of rheostat 44 provides an elastic wave variolosser capable of introducing any degree of attenuation to the elastic wave signal. Other uses for a diverging system will be mentioned hereinafter.

Figure 5:
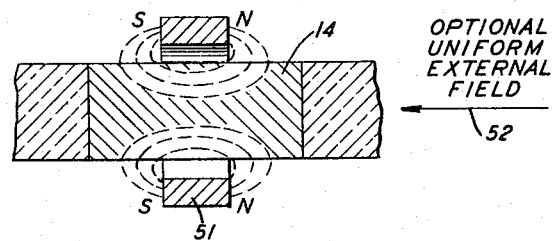

While the required nonuniform field has been produced in the preceding embodiments by utilizing the field inherently produced by certain solenoid configurations, it should be understood that the desired field variation may be produced in other ways. In FIG. 5, for example, a hollow, cylindrical permanent magnet 51 which has been magnetically polarized in a direction parallel to its cylindrical axis, surrounds rod 14. When the diameter of cylinder 51 is large compared to its axial length, the field distribution produced by it in rod 14 simulates the field distribution shown in FIG. 2. This field may be optionally added to or subtracted from a uniform, externally applied field represented by the vector 52 according to the principles described with reference to FIG. 4 to produce focusing or defocusing. The strength of the field produced by cylinder 51 as well as the ratio of the diameter of cylinder 51 to the diameter of rod 14 controls the degree of focusing.

Figure 6:
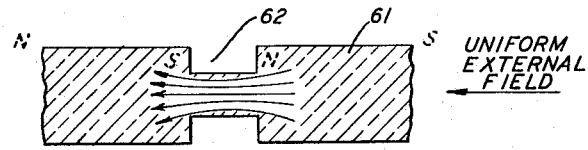
Figure 7:
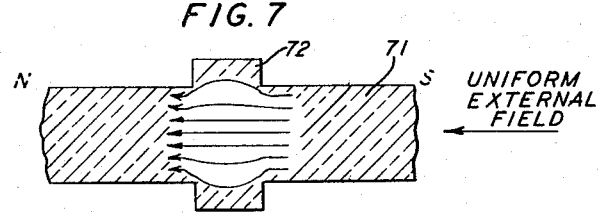

In FIG. 6 shaping of the gyromagnetic member itself in combination with an external uniform field provides a focusing distribution. In particular, gyromagnetic rod 61 is provided with an annular groove 62 circumferentially encircling the rod. Groove 62 restricts the diameter of the magnetic flux path causing the lines of force to concentrate adjacent to the base of groove 62 and to simulate the field distribution shown in FIG. 2. In FIG. 7 gyromagnetic member 71 is provided with an enlarged portion 72 into which the lines of magnetic force expand to produce a defocusing field distribution. While in both FIGS. 6 and 7 the groove and enlargement are shown with rectangular cross sections other shapes would produce field distributions suitable for particular purposes.

Figure 8:
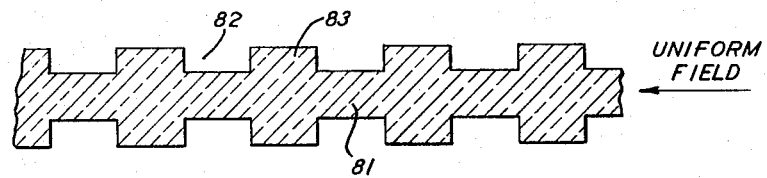

In FIG. 8 a delay medium having a series of alternate converging and diverging focusing regions is shown which utilizes a principle analogous to that known as "periodic focusing" in the traveling wave tube and high energy accelerator arts. In the vast literature concerning these devices it has been thoroughly demonstrated that periodic focusing is the most efficient way to guide, trap or contain beams of electrons or beams of charged particles along an extended path. The elastic wave analogy of FIG. 8 comprises a rod 81 of gyromagnetic material having a large plurality of angular groove portions 82 encircling it which leave alternate enlarged portions 83. Each successive portion distorts the steady magnetic field as described with reference to FIGS. 6 and 7 to alternatively converge and diverge the elastic wave.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, an elastic wave transmission path, means for launching an elastic wave propagating in a given direction along said path, and means interposed along said path for shaping the wavefront of said wave, said means comprising a body of nonconductive ferromagnetic material magnetized with components of magnetization parallel to said given direction that vary in strength with radial distance away from the center of said path.

2. The combination according to claim 1, wherein said strength increases with distance away from said center to converge said wavefront.

3. The combination according to claim 2, wherein said body is magnetized by means including a solenoid surrounding said body, said solenoid having an axial dimension parallel to said given direction that is small compared to its radial dimension.

4. The combination according to claim 3, wherein said means for magnetizing further includes a substantially uniform field polarized in the same direction as and superimposed upon the field produced by said solenoid.

5. The combination according to claim 2, wherein said body is magnetized by means including a uniform axial field applied thereto, said body being shaped to substantially restrict the flux path in one portion thereof as compared to the flux path in other portions thereof.

6. The combination according to claim 2, wherein said means for launching includes an input transducer for launching an elastic wave having a front of given breadth, and including an output transducer for receiving a wave having a front of breadth substantially smaller than said given breadth.

7. The combination according to claim 1, wherein said strength decreases with distance away from said center to diverge said wavefront.

8. The combination according to claim 7, wherein said body is magnetized by means including first and second solenoids surrounding said body polarized to produce opposing axial fields parallel to said given direction, one of said solenoids having an axial dimension that is small compared to its radial dimension.

9. The combination according to claim 7, wherein said body is magnetized by means including a uniform axial field applied thereto, said body being shaped to enlarge the flux path in one portion thereof.

10. In combination, an elastic waveguide, an input transducer for launching an elastic wave propagating along the axis of said guide, and means interposed along said guide for shaping the wavefront of said wave, said means comprising a portion of said guide formed of yttrium iron garnet, and means for applying a magnetic field to said portion in a direction parallel to said axis that varies in strength with radial distance away from said axis.

11. A delay line for elastic wave energy comprising an elastic wave transmission path, a transducer of given area at one end of said path for launching an elastic wave having a front of given breadth propagating in a given direction along said path, a body of nonconductive ferromagnetic material interposed along said path that is magnetized with components of magnetization parallel to said given direction that increase in strength with radial distance away from the center of said path, and a second transducer at the other end of said path having an area substantially less than said given area for receiving an elastic wave having a front of breadth substantially less than said given breadth.

12. In combination, an elastic wave transmission path, means for launching an elastic wave propagating in a given direction along said path, and means interposed along said path for guiding the wavefront of said wave, said means comprising a body of nonconductive ferromagnetic material magnetized with components of magnetization parallel to said given direction that increase in strength with radial distance away from the center of said path in certain regions along said path and that decrease in strength in regions alternating with said given regions.

No references cited.

ROY LAKE, *Primary Examiner.*

D. R. HOSTETTER, *Assistant Examiner.*